US011763217B2

(12) United States Patent
Chandrasekaran et al.

(10) Patent No.: US 11,763,217 B2
(45) Date of Patent: Sep. 19, 2023

(54) DYNAMIC FEATURE LOADING

(71) Applicant: ITERATE STUDIO, INC., Littleton, CO (US)

(72) Inventors: Arulkumaran Chandrasekaran, Tamilnadu (IN); Brainerd Sathianathan, Morgan Hill, CA (US); Chatura Samarasinghe, San Jose, CA (US); Shomron Jacob, San Jose, CA (US); John Selvadurai, San Jose, CA (US)

(73) Assignee: ITERATE STUDIO, INC., Denver, CO (US)

( * ) Notice: Subject to any disclaimer, the term of this patent is extended or adjusted under 35 U.S.C. 154(b) by 374 days.

(21) Appl. No.: 17/128,483

(22) Filed: Dec. 21, 2020

(65) Prior Publication Data

US 2021/0192401 A1 Jun. 24, 2021

Related U.S. Application Data

(60) Provisional application No. 62/951,354, filed on Dec. 20, 2019.

(51) Int. Cl.
*G06F 9/54* (2006.01)
*G06Q 10/06* (2023.01)
(Continued)

(52) U.S. Cl.
CPC ........... *G06Q 10/06* (2013.01); *G06F 3/1275* (2013.01); *G06Q 10/103* (2013.01); *H04L 67/60* (2022.05)

(58) Field of Classification Search
CPC ........... G06F 9/449; G06F 9/547; G06F 9/548
(Continued)

(56) References Cited

U.S. PATENT DOCUMENTS 7,640,503 B1\* 12/2009 Jacquot ................. G06F 9/5083
709/224
9,571,495 B2\* 2/2017 Amiri ..................... H04L 63/10
(Continued)

FOREIGN PATENT DOCUMENTS

EP 3282650 A1 2/2018
WO 2021102264 A1 5/2021

OTHER PUBLICATIONS

"International Search Report & Written Opinion dated Mar. 15, 2021, in PCT Application No. PCT/US2020/061509, 16 pages".
(Continued)

*Primary Examiner* — Andy Ho
(74) *Attorney, Agent, or Firm* — Dorsey & Whitney LLP

(57) ABSTRACT

A configuration server is provided including one or more processors and a workflow generator executing on the one or more processors. The workflow generator is configured to generate a workflow corresponding to a feature of a service. The configuration server also includes a client user interface configured to receive requests from a client user to enable or disable the feature of the service. A service director is configured to control deployment of the feature of the service by placing the workflow corresponding to the feature in an active state or an inactive state responsive to client requests. Responsive to a determination that the workflow is in the active state, the service director communicates the workflow to a deployment server. The feature associated with the workflow is available to an end user accessing the service when the workflow is communicated to the deployment server.

18 Claims, 10 Drawing Sheets

(51) Int. Cl.
  *G06F 3/12* (2006.01)
  *G06Q 10/10* (2023.01)
  *H04L 67/60* (2022.01)

(58) Field of Classification Search
  USPC .......................................................... 719/330
  See application file for complete search history.

(56) References Cited

U.S. PATENT DOCUMENTS

| | | | |
|---|---|---|---|
| 9,672,355 | B2 | 6/2017 | Titonis et al. |
| 10,929,181 | B1 | 2/2021 | Chandrasekaran et al. |
| 2005/0005261 | A1 | 1/2005 | Severin |
| 2008/0028364 | A1 | 1/2008 | Triou et al. |
| 2009/0172576 | A1* | 7/2009 | Cheaz ................. G06F 9/451 715/765 |
| 2015/0007307 | A1* | 1/2015 | Grimes ................. G09B 5/08 726/18 |
| 2016/0359705 | A1 | 12/2016 | Parandehgheibi et al. |
| 2017/0148264 | A1 | 5/2017 | Pichette et al. |
| 2017/0230479 | A1 | 8/2017 | Tolman et al. |
| 2017/0277521 | A1 | 9/2017 | Sharma et al. |
| 2018/0052897 | A1 | 2/2018 | Namarvar et al. |
| 2018/0067732 | A1 | 3/2018 | Seetharaman et al. |
| 2019/0138920 | A1 | 5/2019 | Lin et al. |
| 2019/0228261 | A1 | 7/2019 | Chan |
| 2019/0260782 | A1 | 8/2019 | Humphrey et al. |
| 2019/0286478 | A1 | 9/2019 | Sengupta et al. |
| 2019/0324783 | A1 | 10/2019 | Kazak et al. |
| 2019/0361697 | A1 | 11/2019 | Hu et al. |
| 2022/0179665 | A1* | 6/2022 | Rathod ................. G06F 9/451 |

OTHER PUBLICATIONS

Anonymous, "Don't Block the Event Loop (or the Worker Pool)", Jun. 2, 2018, retrieved from the Internet: URL: https://web.archive.org/web/20180602135112/https://nodejs.org/en/docs/guides/dont-block-the-event-loop, 25 pages.

Gregg, et al., "Dynamic Heterogeneous Scheduling Decisions Using Historical Runtime Data", Jun. 30, 2011, Retrieved from the Internet: URL: http://www.cs.virginia.edu/~mwb7w/publications/A4MMC_11_heterogeneous_scheduling.pdf.

Node-red, "User Guide", https://nodered.org/docs/user-guide/ (Accessed Apr. 6, 2020), Apr. 6, 2020, 11 pages.

Youtube, "What the heck is the event loop anyway?", Uploaded on Oct. 9, 2014 by user "JSConf"; https://www.youtube.com/watch?v=8aGhZQkoFbQ>, (Accessed Feb. 24, 2020).

* cited by examiner

DYNAMIC FEATURE LOADING

CROSS-REFERENCE TO RELATED APPLICATIONS

This application claims priority under 35 U.S.C. § 119 to U.S. provisional patent application No. 62/951,354 entitled "Dynamic Feature Loading," filed on 20 Dec. 2019, which is incorporated by reference herein for all purposes.

TECHNICAL FIELD

Examples described herein relate generally to developing and deploying websites and other mobile or computing services and particularly, to dynamic loading of websites and other mobile or computing services.

BACKGROUND

Many service providers, retailers, or other entities update their websites, applications, or other services frequently. Typically, updating even a small portion of a website requires making the change within the code of the website as a whole, thus creating a new version of the website. Making changes within website code often requires that a design, marketing, or other team member work with a web developer to implement the changes in the code of the website, such that making changes (even small ones) to a website may be time consuming and expensive.

Additionally, many websites have different types or categories of users, e.g., users from different geographic areas, different types of end users, or different temporal conditions (e.g., a season, month, or time of day), but conventional websites require the entire website code be updated to implement changes, such that maintaining different versions of websites and launching different versions at different points and for different end user may be expensive and technically complicated.

Further, some websites may include artificial intelligence (AI) operations, including machine learning (ML) modules, that may be especially time consuming to design and update because of programming knowledge necessary to properly implement. Because of the complexity of operations and computations inherent in many AI operations, some web developers are not trained to implement them and entities that want to include AI operations in their websites or services are confined to a smaller and often more expensive pool of developers or programmers. With the increase in voice activated technology, chatbots, and other consumer interaction features, consumers and end users often desire and expect more AI operations in websites, applications, and other services.

SUMMARY

A configuration server is provided including one or more processors and a workflow generator executing on the one or more processors. The workflow generator is configured to generate a workflow corresponding to a feature of a service. The configuration server also includes a client user interface configured to receive requests from a client user to enable or disable the feature of the service. A service director is configured to control deployment of the feature of the service by placing the workflow corresponding to the feature in an active state responsive to a client user request to enable the feature of the service. The service director also places the workflow corresponding to the feature in an inactive state responsive to a client user request to disable the feature of the service. Responsive to a determination that the workflow is in the active state, the service director communicates the workflow to a deployment server. The feature associated with the workflow is available to an end user accessing the service when the workflow is communicated to the deployment server.

An example method receives a request from an end user device to execute a variable feature of a service. The variable feature corresponds to a plurality of alternative workflows and each of the plurality of alternative workflows corresponds to a version of the variable feature. The version for the variable feature is determined based at least on a characteristic of the request from the end user device. A workflow of the plurality of alternative workflows corresponding to the version of the variable feature is executed.

An example method receives a request to execute a workflow including a variable functionality module and a static functionality module. The variable functionality module is replaced by an execution functionality module for execution of the workflow. The execution functionality module is identified from a plurality of alternative functionality modules and replaces the variable functionality module. A messaging object connecting the execution functionality module to the static functionality module is configured such that an interface of the execution functionality module and an interface of the static functionality module are compatible. One or more instances are deployed within one or more containers associated with the execution functionality module and the static functionality module. The workflow, including the execution functionality module and the static functionality module, is executed to satisfy the received request.

An example method renders an interface for a service by loading a general code corresponding to the service responsive to a request from an end user to access the service. The general code is parsed. Responsive to an indication in the general code that the service includes a variable feature, a version of the variable feature to include in the service is determined based at least on a characteristic of the request from the end user to access the service. Responsive to an indication in the general code that the service includes a static feature, a determination is made regarding whether the static feature is in an active state or an inactive state. The interface for the service is generated by retrieving a first workflow corresponding to the determined version of the variable feature from a plurality of alternative workflows and retrieving a second workflow corresponding to the static feature responsive to a determination that the static feature is in an active state. The first workflow and the second workflow are integrated into the general code to generate the interface and the rendered interface for the service is delivered to the end user.

DETAILED DESCRIPTION

Figure 1:
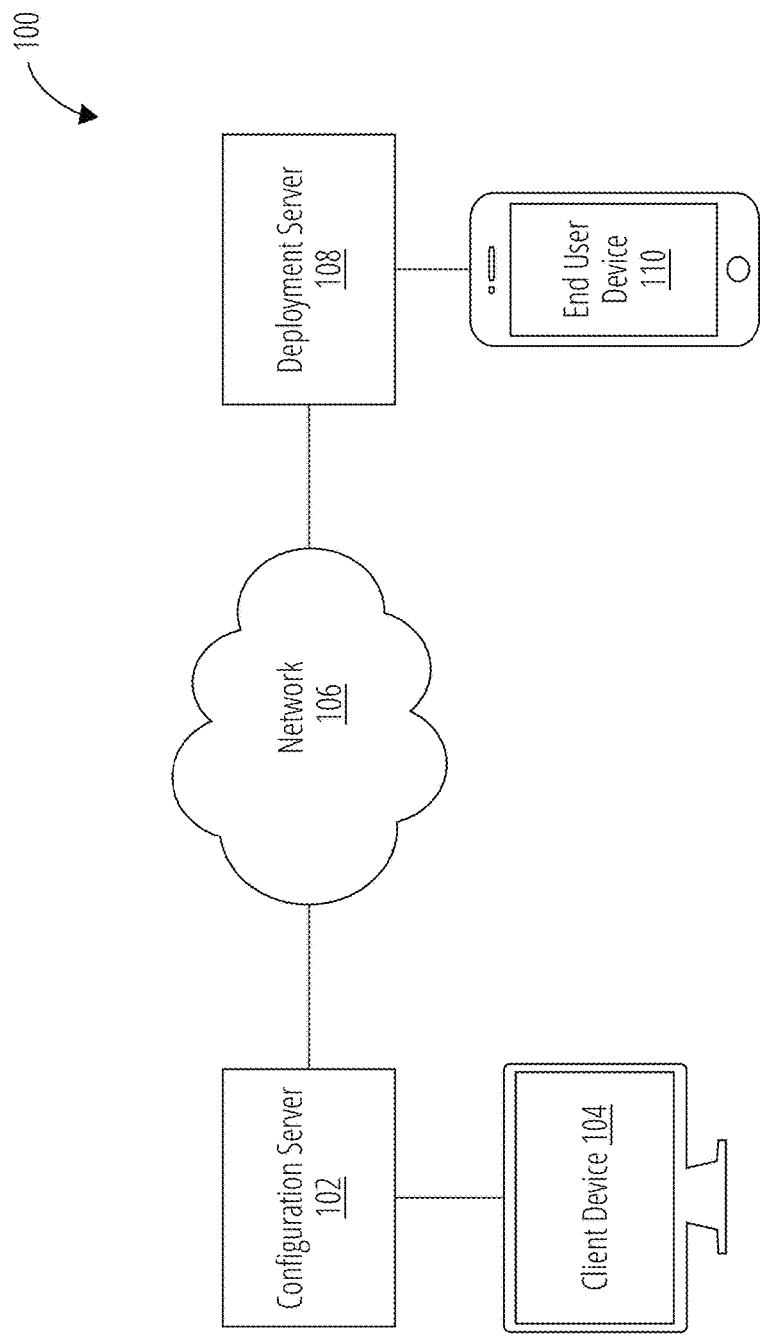
FIG. 1 illustrates a system for developing and deploying a feature of a service in accordance with one embodiment.

The present disclosure includes a system and method for deploying a service, such as a website or application, with variable features or functionality, without requiring a rewrite or otherwise impacting the code base. Generally, websites and mobile applications are deployed as a whole, such that the entire code loads the same way when a user requests the service. Some websites or services deploy different versions for different classes of users (e.g., mobile users see a different version than desktop users) but the service is still deployed as a whole. When a website is deployed as a whole, changes to one feature of the website require updating the entire code of the website. If a developer or domain owner wants to offer different versions of the service for different users, alternative versions of the entire service must be developed and maintained.

The present system allows developers to load features of a system differently dependent on the user. Accordingly, only separate versions of features are developed and maintained and making adjustments to features of a service does not require a new version of the service as a whole. A feature of the service may be, for example, a frequently asked questions feature that accepts free form questions from users and uses a natural language processor (NLP) to locate relevant answers or help topics or a predictive text module for a search feature. A variable feature may be included in a version of the service or content presented to an end user in some situations and may not be included in another version of the service presented in other situations, e.g., different versions of a service may be presented to different classes of end users, during different periods of time, or in different geographic regions.

Variable or add on features may also be controlled using a client user interface with a feature control corresponding to each of the variable features. A client user, such as a company providing the service (e.g., website), may access the client user interface to configure conditions when various versions of a variable feature will be included in the service. For example, a client user could use the client user interface to deploy a first version of the frequently asked questions feature in a first geographic region and a second version of the frequently asked questions feature in a second geographic region where of the two versions include NLP modules configured for the dialect of the corresponding geographic region. The client user interface may also allow the client user to start or stop individual features of a service without taking the entire service offline.

The client user interface may also include a graphical programming interface for developing and deploying AI and ML. In one embodiment, the system includes a configuration server that interacts with a client device to enable a client user to develop and deploy application executables easily, such as by placing and connecting functionality modules in a drag-and-drop user interface or other type of visual programming interface. The functionality modules define self-contained executable components that receive inputs from other connected functionality modules, execute desired functionality, and may then output data related to the processed inputs to other connected functionality modules. The functionality modules are connected so that inputs into a respective functionality module are translated into a desired language, format, or the like, allowing the functionality modules to receive various types of inputs from various other functionality modules, without requiring specialized programming.

Referring to FIG. 1, an example system 100 includes a configuration server 102 and a deployment server 108. The configuration server 102 is in communication with a client device 104. The configuration server 102 may provide a graphical programming interface to be displayed on the client device 104 to allow the client user to develop ML or other AI solutions using drag and drop programming inputs. For example, the configuration server 102 may use the graphical programming interface disclosed in U.S. patent application Ser. No. 16/692,590, entitled "Container Architecture for Modular Machine Learning," which is hereby incorporated in its entirety for all purposes. The configuration server 102 may also provide a client user interface that allows the client user to control deployment of individual features of a service. This client user interface may be separate from the graphical programming interface or the graphical programming interface may be presented as part of the client user interface, see e.g., FIG. 4.

The client user interface includes feature panels corresponding to various features of a service. For example, a client user interface for a client user providing a retail website may include feature panels for select categories of features or functions, including those already implemented and others that are "trending" or otherwise selected for the client. A few examples of features that may include icons or other representations in the features panel include frequently asked question features, search features, payment features, and other AI or non-AI functionality. Feature panels may include feature control elements that allow the client user to start or stop deployment of the feature as part of the service. For variable features, which may load differently depending on the user accessing the service, the feature panels may include controls to allow the client user to control to select versions of the variable features and the conditions under which each version of the variable feature will be deployed as part of the service.

The configuration server 102 communicates with the deployment server 108 via a network 106, such as a WiFi, cellular, or other network. The configuration server 102 communicates information from the client user interface and the graphical programming interface (or other client input interface) to the deployment server 108 for deploying the service responsive to a request from an end user device 110. For example, the configuration server 102 may communicate as a client user activates/deactivates a feature of the service so that the deployment server 108 can adjust the service accordingly, i.e., deploy or recall the feature or module. The configuration server 102 also communicates as variable features or conditions for variable features are changed by the client user. The deployment server 108 may evaluate requests received from the end user device 110 based on conditions of deployment and/or of the variable feature and deploys the correct or selected version of the variable feature to the end user device 110.

The deployment server 108 may render a service (e.g., a website) including one or more variable features and static features using code for the service in conjunction with workflows corresponding to features intended for the end user device 110 requesting the service. In one example, the end user device 110 may generate a request for the deployment server 108 to render a website including an FAQ module that is a variable feature (e.g., one of three workflows for the FAQ module is deployed with the website dependent on the location of the end user device 110) and a chatbot that is a static feature whose deployment is controlled by the client user interface. When the deployment server 108 receives a request from the end user device 110 to render the website, the deployment server 108 first loads general code for the website. The general code may, in some implementations, include features such as layout of the website and graphics. Continuing with the above example, the general code includes an indication in the code to the deployment server 108 that the website includes the FAQ module implemented as a variable feature and the chatbot implemented as a feature controlled by the client user interface.

When the general code includes indications for variable features or features controlled by the client user interface, the deployment server 108 evaluates deployment conditions for the variable features to determine which versions to include in the rendering of the website. Similarly, the deployment server 108 evaluates whether the static features are currently in an active state or an inactive state and includes features in an active state in the rendering of the website. In some implementations, the general code may include additional instructions for the deployment server 108 for integrating variable features and static features into the rendering of a website.

In some implementations, aspects of a service may be separate features of the service and can be developed and controlled by the client user. In other implementations, the service is implemented using web development stored on the deployment server 108 and is augmented by the client user to add features developed using, for example, the graphical programming interface, or other programming interfaces (including non-graphical or text based interfaces). However, in embodiments utilizing a graphical programming interface as the client user interface allows the client user, even without extensive technical programming knowledge, to efficiently develop and update the service. The client user interface also provides the client user direct control over timing of updating the service and generating varied experiences for different end users without requiring development and redevelopment of the service through a developer to implement changes. Variable features controlled by the client user interface also allow client users to tailor features of a service for particular end users, providing an improved experience for end users.

Features may be implemented using workflows developed using a client programming interface (e.g., a graphical programming interface) or obtained from a collection of workflows available to a client user. Static features are implemented by executing one workflow at the deployment server 108 for all users when the feature is made available by the client user through the client user interface. Variable features may have several versions, where each version is implemented by a different workflow executed at the deployment server 108 depending on a characteristic of the request from the end user device 110. The deployment server 108 may use load balancing, such as the developer independent resource based multithreading module disclosed in U.S. patent application Ser. No. 16/692,941, entitled "Developer Independent Resource Based Multithreading Module," which is hereby incorporated in its entirety, during execution of workflows. The deployment server 108 may also use methods described in U.S. patent application Ser. No. 16/692,590, entitled "Container Architecture for Modular Machine Learning," to execute workflows including functionality modules and messaging objects.

Figure 2:
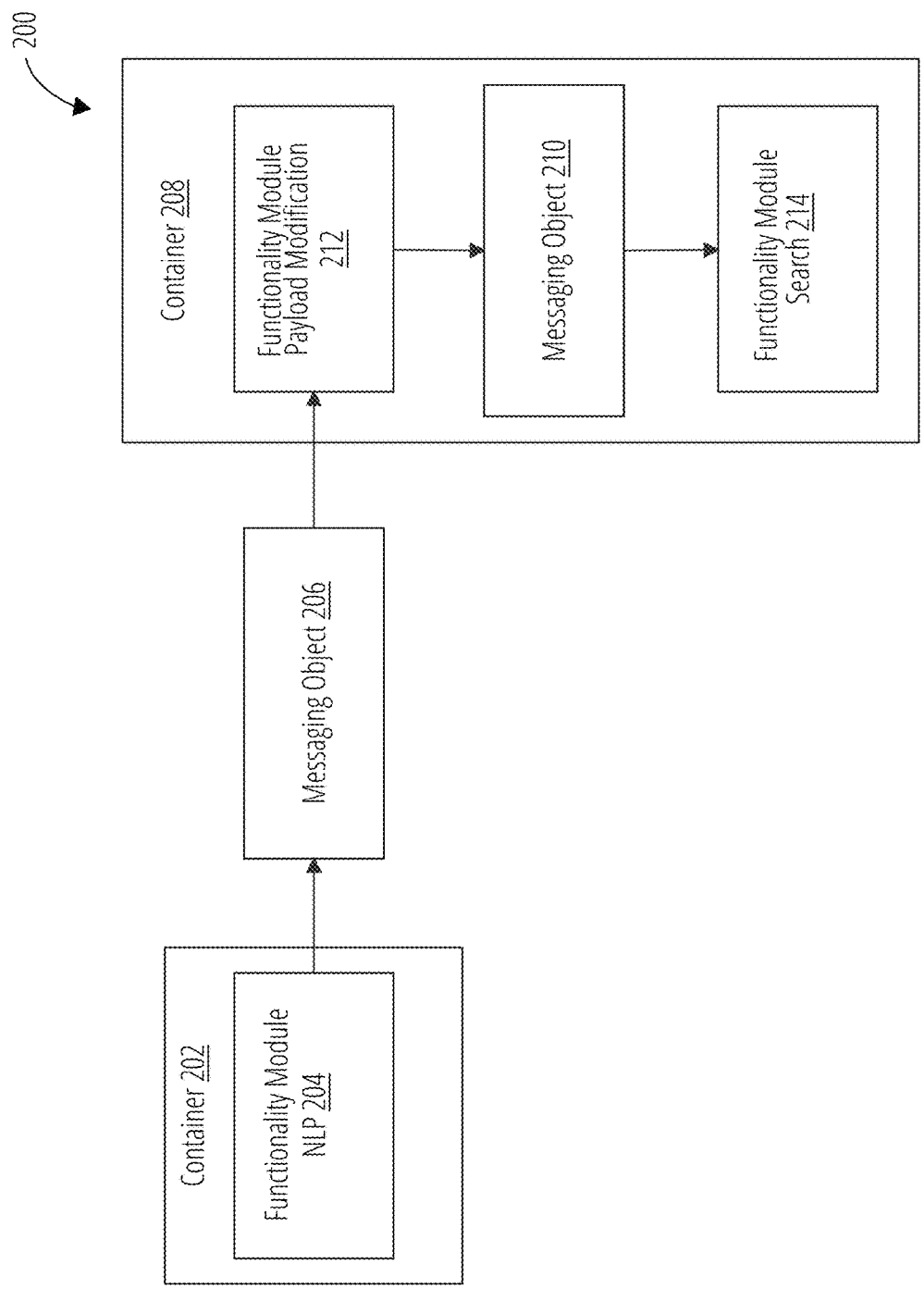
FIG. 2 illustrates a workflow for implementing and deploying a feature of a service.

Referring to FIG. 2, an example workflow 200 created using a client facing programming interface includes functionality modules 204 and 214 connected by a messaging object 206 and a functionality module 214 connected to the functionality module 212 by a messaging object 210. The workflow 200 may define a multiplatform based programming package or process that can be deployed for use, such as on the deployment server 506, or other server. The package defined by the workflow 200 executes a first functionality module 204 that generates one or more outputs. The outputs of the first functionality module 204 are translated and passed by a messaging object 206, to the input of a second functionality module 212. The second functionality module 212 executes a second functionality using the output from the first functionality module 204. The second functionality module 212 generates one or more outputs, which are translated and passed by a second messaging object 210, to a third functionality module 214. The third functionality module 214 executes a functionality using the output from the preceding functionality module, and may also generate one or more outputs. The functionality modules that execute may utilize the inputs to complete an analysis or other function, such as an AI analysis, where the output of the analysis is then provided to the next module for use as an input, which allows a user to easily incorporate and exploit AI functionality.

In a specific example, the multiplatform based programming package defined by the workflow 200 executes a website that monitors user inputs and processes them through an NLP module to determine a topic to which a user's question relates. The package can then search for related subject matter and return related results to the user. In the example of FIG. 2, the FAQ is adapted to interface with an end user such as a customer of a business with both online and outlet stores. The workflow includes a first container 202, that contains the first functionality module 204. The workflow 200 also includes a second container 208 that contains the second functionality module 212 and the third functionality module 214.

In the FIG. 2 example, the first container 202 is a virtual container executing a first environment, e.g., a python 3.7 interpreter. The first functionality module 204 within the first container 202 provides an AI functionality, e.g., NLP (also called natural language understanding or "NLU") functionality. The first functionality module 204 receives as an input a user query and converts the query into another form using the AI or ML framework. For example, the first functionality module 204 can convert the query into structured data with a high degree or organization or with a defined schema, such as a relational database. The first functionality module 204 can also convert the query into semi-structured data that does not have a pre-defined data model, or schema, or is not organized in a pre-defined manner, yet has some level or organization of the information such as in a hierarchy, categories, or groups of data.

As some examples of the conversion via the first functionality module 204, a user can start a conversation with a customer service chat function or bot by inputting a query such as, "Can I purchase gift cards on your website or in an outlet store?" Such a query can be received by a functionality module adapted to receive user queries and passed into the input of the first functionality module 204 (e.g., via a messaging object). In the example shown in FIG. 2, the first functionality module 204 converts the query text received from the first module into semi-structured data in a format such as JavaScript notation ("JSON"), extensible markup language ("XML"), or the like. For example, the first functionality module 204 could output a JSON string such as, "{"intent": "buy_gift_card", "entities": {"location": {"website", "outlet"} } }," representing the input query in a semi-structured data format. In this example, the functionality module 204 interpreted the query text to determine that the user intends to buy a gift card, from either the company's website or an outlet store.

The first functionality module 204 can accomplish this functionality by using an AI framework selected from among applicable AI frameworks. Such frameworks execute in a variety of operational environments, such as in machine language environments, interpreted environments, or scripted environments. The first container 202 can be selected to provide an appropriate environment for a selected AI framework. In a specific example, an AI framework providing the functionality of the first functionality module 204 could be a python package. More specifically, the AI framework could be a package that runs in a python 3.7 interpreter or other environment and the first container 202 is selected to then provide a python 3.7 interpreter as the operating environment.

Generally, AI functionality modules, such as the first functionality module 204, should be trained to provide more accurate or meaningful results. In this manner, an input to the first functionality module 204 can be a set of training data including natural language text queries from users and corresponding structured or semi-structured data resulting from analysis of that data. For example, the training data could be compiled from a list of frequently asked questions. The training data can be provided as a file, list, database, or other suitable format. Utilizing a set of queries and structured or semi-structured can train the AI of the first functionality module 204 to recognize similar queries and parse them into structured or semi-structured data. The first functionality module 204 can also accept a number of tuning parameters on its input as well, that can help customize and tailor the analysis of the queries. Tuning parameters can be used to set up or change the behavior of AI functionality. In some specific examples, tuning parameters can change the learning rate of an AI functionality, for example by changing the amount of learning from data received. Tuning parameters can change the error tolerance of an AI functionality. Tuning parameters can also affect the weight or weight function of perceptrons in a neural network. In examples where an AI functionality is a non-neural algorithm, the tuning parameters can affect support vectors. Additionally, the first functionality module 204 can continually train itself as it is deployed to provide more meaningful results.

The system 100 connects various functionality modules using messaging objects (e.g., the first messaging object 206. Messaging objects pass information from the output of one or more functionality modules to other functionality modules. A messaging object can be structured data in a database or semi-structured data in a format such as JSON or XML. A messaging object can have any set of properties desired to connect two functionality modules. In one embodiment, a messaging object has a payload property representing the data being passed between functionality modules. A messaging object can also have a property such as a messaging identifier or ID that can be used to track the messaging object as it passes through a workflow. In the example of FIG. 2, the semi-structured data output from the first functionality module 204 can be passed to the input of the second functionality module 212 by a first messaging object 206. In the above example, the first messaging object 206 could have a payload property containing the JSON string, "{"intent": "buy_gift_card", "entities": {"location": {"website", "outlet"} } }. The first messaging object 206 could also have an ID such as "1234", that identifies the first messaging object 206 within the workflow 200. The first messaging object 206 can pass into the input of the second functionality module 212. The system 100 can configure a messaging object, such as the first messaging object 206 to connect to disparate functionality modules, such as between the first functionality module 204 and the second functionality module 212.

In this example, the second container 208 is a virtual container executing a second operating environment, e.g., a JavaScript interpreter. The second container 208 contains both the second functionality module 212 and the third functionality module 214. The second container 208 could be, for example, a server side JavaScript engine running on a deployment server 108, a client side JavaScript engine embedded in a web browser on an end user device 110, or another virtual or physical container. Because the second functionality module 212 is contained in the second container 208, it uses JavaScript to provide its functionality.

In this example, the second functionality module 212 is a script in JavaScript format adapted to parse the JSON data received from the first functionality module 204 on its input. However, the second functionality module 212 can implement any kind of JavaScript code or framework to operate on the first messaging object 206 passed into its input. In this example, the second functionality module 212 parses the JSON data and converts it to a query suitable to input into a search engine. The second functionality module 212 then passes the query, using a second messaging object 210, to the third functionality module 214. The second functionality module 212 could also modify the payload of the first messaging object 206 and pass it to the third functionality module 214. Also, the second functionality module 212 can pass an array of messaging objects on its output, to one or more other functionality modules. The second functionality module 212 can also pass log messages, errors, or warnings to aide in debugging of a multiplatform based programming package developed using the system 100.

In the workflow 200, the third functionality module 214 has the functionality of interfacing with an API of a third-party search provider, separate from the system 100. The third functionality module 214 receives the search query from the second functionality module 212 on its input, via the second messaging object 210, sends the query to the third-party provider, and receives the search results. The third functionality module 214 can implement and API identifier and license key to identify to the third-party provider that the search is originating from the package defined by the workflow 200. The third functionality module 214 can also identify a pre-compiled index of search results against which to check the query (e.g., to increase the speed at which results are returned). The third functionality module 214, in this example, can implement its functionality in a JavaScript environment, and is suitable for residing in the second container 208 also containing the second functionality module 212. The third functionality module 214 can output the search results returned from the third-party search provider to other functionality modules, such as via the payload object of a messaging function passed in its output. The third functionality module 214 can adapt, format, or further modify the results, or send to other functionality modules, ultimately to a functionality module that displays the results to the user, for example, by generating HTML for display by a web browser on an end user device 110.

As can be understood, a messaging object is highly flexible and able to connect disparate functionality modules executing in different containers and thus different environments. The system 100 configures the messaging object 206 and the messaging object 210 to adapt their data, payloads, and interfaces to match the format and data needs of the inputs and outputs of the various functionality modules deployed in a workflow 200. This flexibility of messaging objects allows the system 100 to include functionality modules of many different types, operating in different containers into a seamless multiplatform based programming package.

Figure 3:
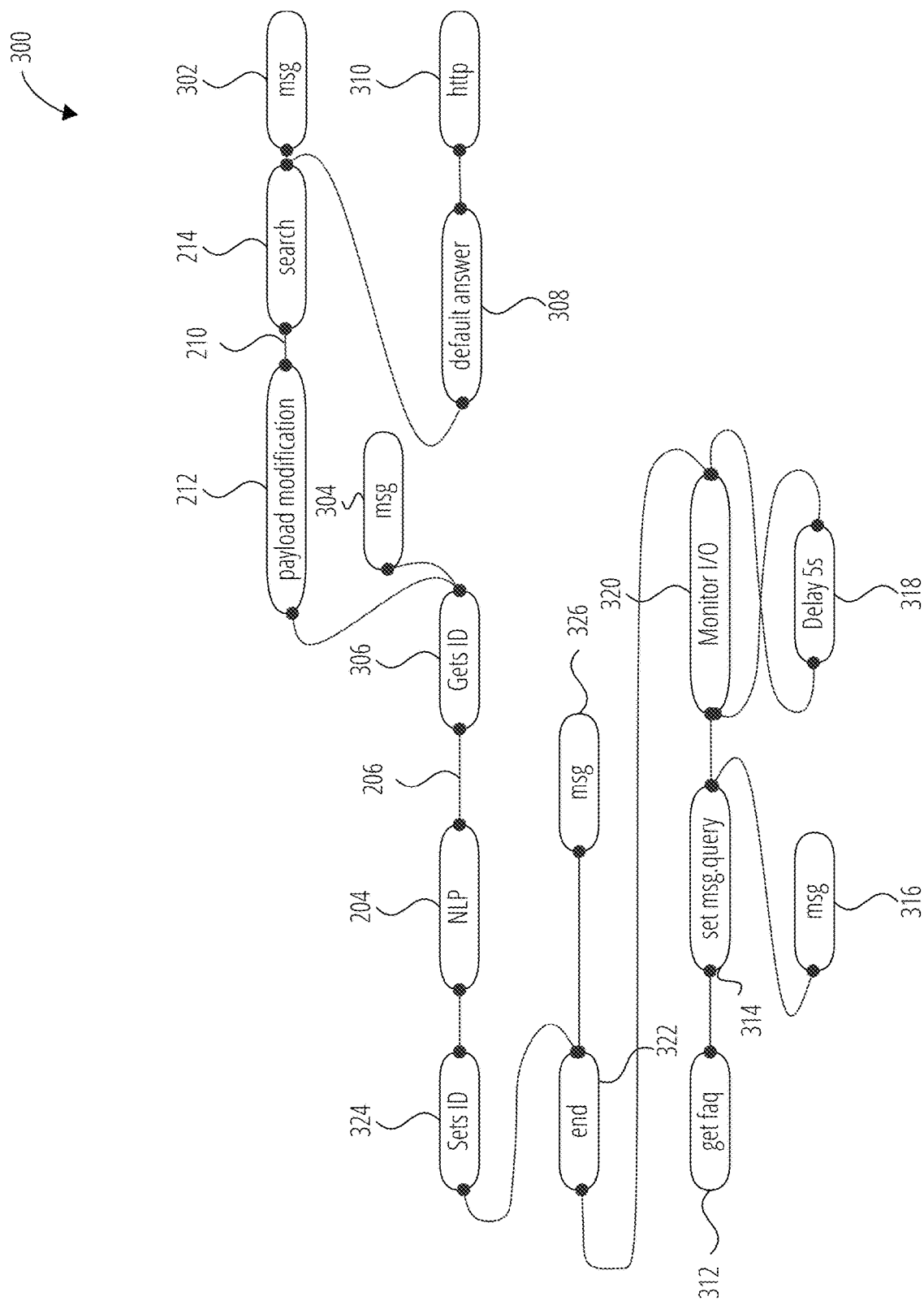
FIG. 3 illustrates a graphical programming interface used to create a workflow to be launched or loaded, such as in FIG. 2.

FIG. 3 illustrates another example of a completed workflow 300 that can be built and executed via the system 100 or deployed as a multiplatform based programming package or process. The functionality modules 204, 212, 214 are implemented as discussed above. Other examples of functionality modules can be similar to those already discussed, and implement the following functionality. Functionality module 312 implements an HTTP GET request, requesting an FAQ data set to train the functionality module 210. Some functionality modules, which can use different and otherwise incompatible software and/or hardware environments, can operate within virtual containers on a server or on multiple servers. Functionality module 314 can set a user's search query in the payload of a messaging object. Functionality module 320 can monitor the user input to provide results as the user types. Functionality module 318 can implement a delay for the first request on the search engine of functionality module 212, to allow the user to type a meaningful amount of the query for an initial search. Functionality module 324 can set an ID for the messaging object 206. Similarly, functionality module 306 can retrieve the ID of the messaging object 206. Functionality module 308 can further manipulate the search results received from the third-party search provider whose API is interfaced via the functionality module 212, for example using JavaScript code to provide response logic, filtering, and error handling. Functionality module 310 can output the search results to the end user by generating HTML code for display on the end user device 110. Functionality module 322 can end the workflow 200. Functionality modules 302, 304, 316, and 324 are optional debug messaging functionality modules.

In some implementations, the workflow 300 includes a variable functionality module that acts as a placeholder for multiple functionality modules in a workflow. For example, the functionality module 204 could be replaced by a variable functionality module. At runtime, the variable functionality module would be replaced by an execution functionality module for execution of the workflow 300. For example, the variable functionality module acts as a placeholder for the functionality module 204 as described above trained to perform NLP for a dialect common in a first geographic region and a second NLP functionality module trained using different data to perform NLP for a dialect in a second geographic region. When the workflow 300 is executed as a result of a request from an end user device 110 in the first geographic region, the functionality module 204 is identified as the execution functionality module and replaces the variable functionality module when the workflow 300 executes as described above. When the workflow 300 is executed as a result of a request from an end user device 110 in the second geographic region, the second NLP functionality module is identified as the execution functionality module and replaces the variable functionality module when the workflow 300 is executed as described above.

The workflow 300 shown in FIG. 3 may be constructed by a client user as part of a configuration user interface displayed on the client device 104 by the configuration server 102. In this example, the configuration server 102 may include a library of functionality modules that the client user can drag, drop, and connect to create workflows, such as the workflow 300. The configuration user interface used to construct the workflow 300 may be, for example, a drag and drop interface as disclosed in U.S. patent application Ser. No. 16/692,590. The configuration user interface may also include a variety of template workflows that can be used to implement common website features. The template workflows may be modified by the client user using the same or a similar library of functionality modules and a drag and drop interface. Template workflows can also be modified to include variable functionality modules. Both the drag and drop graphical programming interface and the use of template workflows can make workflow creation more user friendly such that the client user can implement sophisticated features, such as AI features, without advanced technical knowledge.

The graphical programming interface may be in communication with a workflow generator executing on the configuration server 102. The workflow generator generates the workflow responsive to input from the client user via the graphical programming interface. For example, the workflow generator may configure the messaging object 206 responsive to the client user creating a link between the functionality module 204 and the functionality module 212. Accordingly, the client user can connect functionality modules that may otherwise be incompatible and the workflow generator of the configuration server 102 configures the messaging object so that the functionality modules can adapt an output of a first functionality module for input into a second functionality module. In one example, the messaging object 206 is configured based on a predefined relationship between the functionality module 204 and the functionality module 212. In other implementations, the workflow generator may use other characteristics of the functionality module 204 and the functionality module 212, such as their respective inputs and outputs, to configure the messaging object 206.

Figure 4:
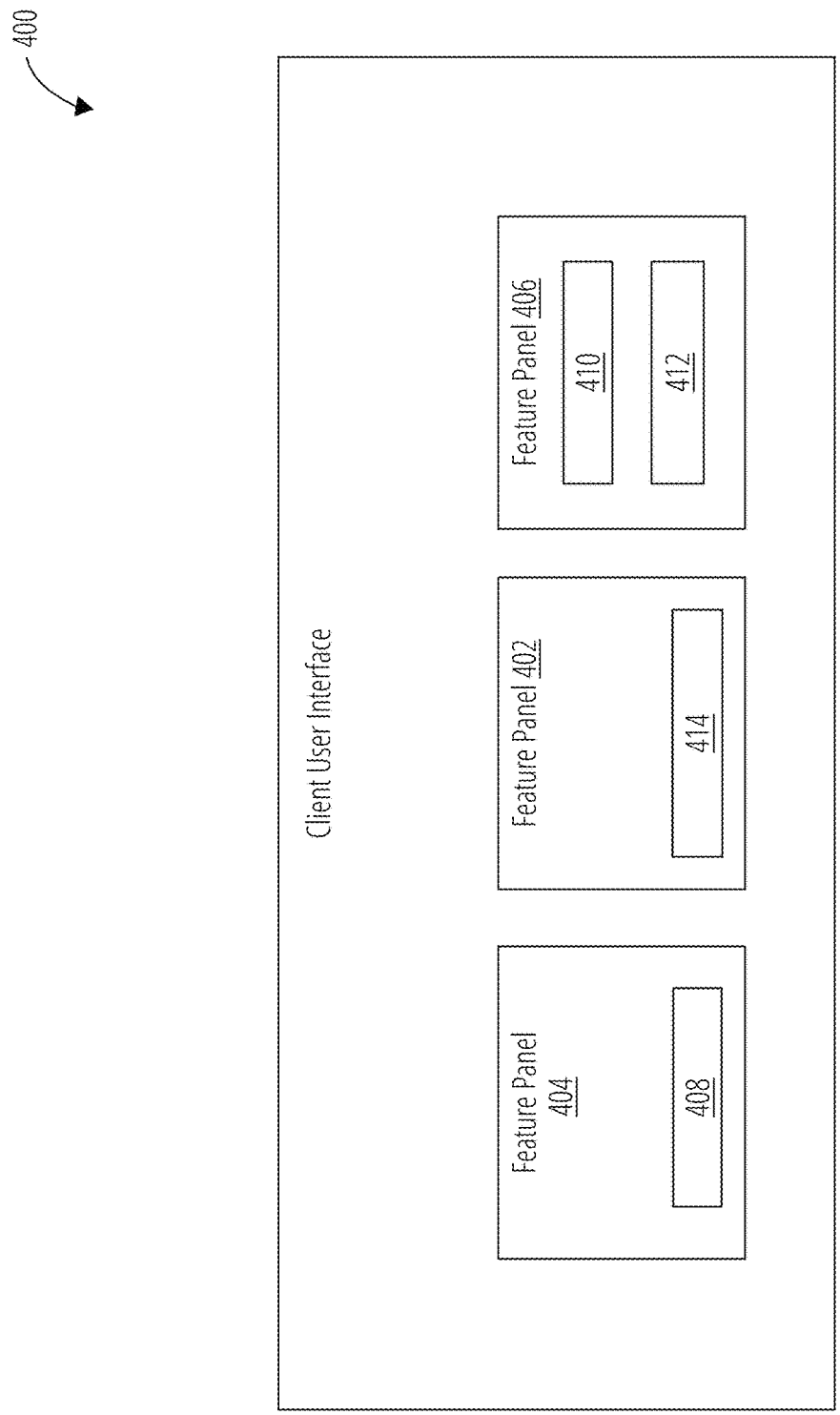
FIG. 4 illustrates a client user interface for controlling deployment of features of a service.

FIG. 4 illustrates a client user interface 400 for controlling features of a service. The client user interface 400 may be displayed on a client device 104 and may be separate from or a part of the graphical programming interface 300 discussed above with respect to FIG. 4. Generally, the client user interface 400 includes one or more feature panels (e.g., feature panel 402, feature panel 404, and feature panel 406) including elements used to control the deployment of corresponding features of a service. Feature panels or feature windows may vary in layout and content based on the feature corresponding to the feature panel. For example, the feature panel 404 and the feature panel 402 correspond to static features, meaning that when the feature is active the feature loads the same way when the service is deployed by the deployment server 108. Feature panel 406 corresponds to a variable feature, meaning the feature may load differently depending on a characteristic of an end user request to access the service.

Static features generally have an active state and an inactive state. When the feature is in the active state, the deployment server 108 deploys the service including the feature and when the feature is in the inactive state, the deployment server 108 deploys the service without the feature. The ability to control individual features of a service in this manner means that the client user can make frequent changes to the service without configuring a new version of the entire service to make small changes related to individual features. As such, if a feature is not operating correctly, the client user can simply place the feature in an inactive state while keeping the remainder of the service running properly. The client user can also easily plan for and deploy features of the service for limited or defined periods of time, such as adding a holiday shipping FAQ module or a sale module for a retailer.

Feature panel 404 includes a feature control element 408 that receives user input to control deployment of the feature corresponding to the feature panel 404. Generally, the feature control element 408 can be used to place a feature in the active state or the inactive state. The feature control element 408 may be a button that, when selected, transitions the feature between an active state and an inactive state or may be a button that launches a menu where the user can define when the feature will switch between the active state and the inactive state. For example, the user could generate settings so that the feature is in the active state every weekend and in the inactive state during the remainder of the week, so that a feature is in the active state during certain times of the year, or so that a feature is active for a class of users. The feature panel 404 may also include an indicator showing when a feature is in the active state and when the feature is in the inactive state. For example, the feature control element 408 could display a "stop" icon when the feature is in the active state and a "play" icon when the feature is in the inactive state. The feature panel 404 could use other display characteristics (e.g., highlighting, font differences, or shading) to indicate when a feature is in the active or inactive state.

In some implementations, the user may define or include in the user interface several alternative features. For example, an online retailer may have a holiday shipping FAQ and a regular shipping FAQ where the holiday shipping FAQ is in the inactive state when the regular shipping FAQ is in the active state and in the active state when the regular shipping FAQ is in the inactive state. Alternative features may be controlled by a single feature panel or may be controlled by separate, linked feature panels. Where alternative features are controlled by a single feature panel, the feature control element may be, for example, a menu or other listing that allows the user to create a schedule for availability of the alternative features or a button that toggles between alternative features. Where alternative features are controlled by linked feature panels, user interaction with the feature control element of one feature panel affects the other linked feature panel. In an example, the feature panel 404 and the feature panel 402 are linked such that when a user selects the feature control element 408 to place the feature corresponding to feature panel 404 in the active state, the second feature control element 414 changes to indicate that the feature corresponding to the feature panel 402 is in an inactive state (e.g., the feature control element 408 displays a play icon instead of a stop icon when the feature is in the inactive state). Feature panel 404 and feature panel 402 may include a linking element, such as a check box, button, or additional menu that the user can interact with to link and unlink feature panels as desired. Linked feature panels may also be used to ensure that related features are placed in the inactive state or the active state at the same time. For example, an online retailer may have several features related to holiday sales and can link those features so that the service is either deployed with all of the holiday features or none of the holiday features.

Feature panel 406 corresponds to a variable feature that may be communicated to the deployment server 108 as multiple alternative workflows and a request characteristic or as a workflow including a variable functionality module and a request characteristic for determining which of multiple alternative functionality modules to use as an execution functionality module. The feature panel 406 includes a variable feature control element 410 and a feature condition control 412 so that a user can control alternative workflows or alternative functionality modules that include different versions of the feature and feature conditions to control when different versions of the feature are deployed with the service. For example, the variable feature control element 410 may display a menu where the user can add alternative workflows corresponding to different versions of a feature or alternative functionality modules that can be loaded as part of a workflow with a variable functionality module to implement different versions of the feature.

Using the feature condition control 412, a client user can set rules for when different versions of the variable feature will display for an end user, dependent on a characteristic of the end user's request. The characteristic of the request can be, for example, temporal, geographic, a characteristic of the end user device 110 (e.g., an operating system or device type), or a class of the user (e.g., if the user is a premium subscriber to a service). For example, an online retailer could load different versions of a shipping FAQ dependent on a geographic location of the end user. In another example, an online retailer could load one version of an online shopping assistant for end users with premium subscriptions to the online retailer and another version of the online shopping assistant for general users without a premium subscription Like the variable feature control element 410, the feature condition control 412 may be a button or link that launches another menu to allow the client user to adjust a feature condition for the feature corresponding to the feature panel 406.

Generally, the client user interface 400 is in communication with the configuration server 102. A service director of the configuration server 102 may receive requests made via the client user interface 400 and, responsive to client user requests, the service director can place workflows in active states or inactive states and communicates the state of a workflow to the deployment server 108 over a network 106. The service director can also communicate workflows to the deployment server 108 when the workflows are placed in the active state. For variable features, the service director communicates changes to the feature condition or versions of the variable feature to the deployment server 108 once the changes are made via the client user interface 400. Accordingly, changes to features made on the client user interface 400 can be deployed quickly to a live version of the service deployed by the deployment server 108 without creating a new version of the entire service.

In some implementations, the client user interface 400 may include a service simulation to allow the client user to preview changes to features of the service before communicating the changes to the deployment server 108 for inclusion in the live version of the service. Further, the client user interface 400 may be integrated with the graphical programming interface 300 such that a client user can utilize the graphical programming interface 300 to develop a new feature and then preview and control the new feature using the client user interface 400. Integration between the graphical programming interface 300 and the client user interface 400 allows technically unsophisticated client users to develop and deploy features of a service without utilizing outside developers.

Figure 5:
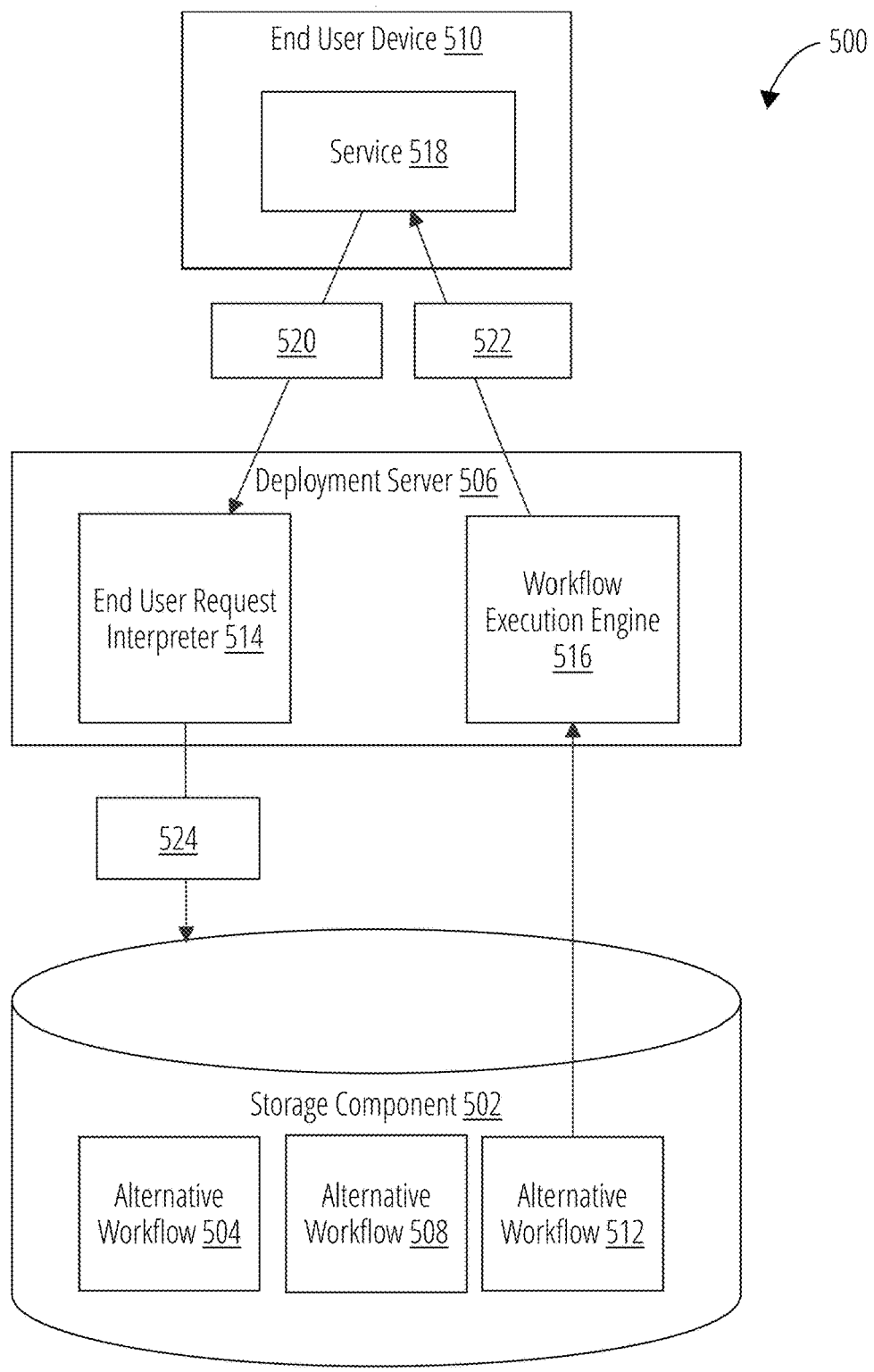
FIG. 5 illustrates a deployment system for deploying a service with a variable feature.

FIG. 5 illustrates a deployment system 500 deploying a service including a variable feature implemented by selecting an alternative workflow for execution when deploying the variable feature. An end user device 510 requests access to a service 518 whose deployment is controlled by a deployment server 506 by sending an end user device request 520 to the deployment server 506. The end user device request 520 may be sent over a network such as the network 106, which may be for example, a cellular or WiFi network.

The deployment server 506 receives the end user device request 520 at a communication interface and passes the end user device request 520 to an end user request interpreter 514. Generally, the end user request interpreter 514 parses the end user device request 520 to identify the service 518 associated with the end user device request 520. When the service 518 identified by the end user request interpreter 514 is a service including a variable feature, the end user request interpreter 514 determines a feature condition associated with the variable feature. The feature condition generally determines which version of the variable feature the deployment server 506 should deploy to the end user device 510 based on the end user device request 520.

The end user request interpreter 514 generates a request characteristic 524 using the determined feature condition and the end user device request 520. Generally, the end user request interpreter 514 evaluates the end user device request 520 for the feature condition and passes the result to a storage component 502 including a plurality of alternative workflows so that the correct alternative workflow is retrieved for the end user device request 520. In one example, a feature condition is a device type, such that an alternative workflow 504 is used when the end user device 510 is a mobile device (e.g., a smart phone), an alternative workflow 508 is used when the end user device 510 is a voice activated smart hub, and an alternative workflow 512 is used when the end user device 510 is a wearable smart device (e.g., a smart watch). When the end user request interpreter 514 receives the end user device request 520, the end user request interpreter 514 identifies device type as the feature condition and evaluates the end user device request 520 to determine the device type of the end user device 510. The end user request interpreter 514 then sends the request characteristic 524, indicating the device type of the end user device 510 to the storage component 502 to retrieve the correct alternative workflow for the end user device 510.

The storage component 502 may be located on the deployment server 506 or at a storage repository in communication with, but separate from, the deployment server 506. In some implementations, instead of sending a request characteristic 524 to the storage component 502, the end user request interpreter 514 may use the request characteristic 524 to determine which alternative workflow to request from the storage component 502.

In the example shown in FIG. 5, the request characteristic 524 is correlated to the alternative workflow 512 on the storage component 502. In the previous example, this indicates that the end user device 510 is a smart watch. The deployment server 506 retrieves the alternative workflow 512 from the storage component 502 and executes the alternative workflow 512 using a workflow execution engine 516. In some implementations, the workflow execution engine 516 may deploy one or more containers associated with functionality modules in the alternative workflow 512, as discussed in U.S. patent application Ser. No. 16/692,590. In some implementations, the workflow execution engine 516 may distribute tasks associated with the alternative workflow 512 to one or more processors associated with the deployment server 506 using a developer independent resource based multithreading module, as disclosed in U.S. patent application Ser. No. 16/692,941.

When the alternative workflow 512 is executed at the workflow execution engine 516, the deployment server 506 sends an end user request response 522 to the end user device 510 to fulfill the end user device request 520 from the end user device 510 and to deploy the service. As described above with respect to FIG. 4, the deployment server 506 may be in communication with a configuration server 102 to receive updates to variable features of the service 518, such as additional alternative workflows or changes to the feature condition associated with the variable features of the service 518. The deployment server 506 may implement received updates for end user device requests received after the update.

Figure 6:
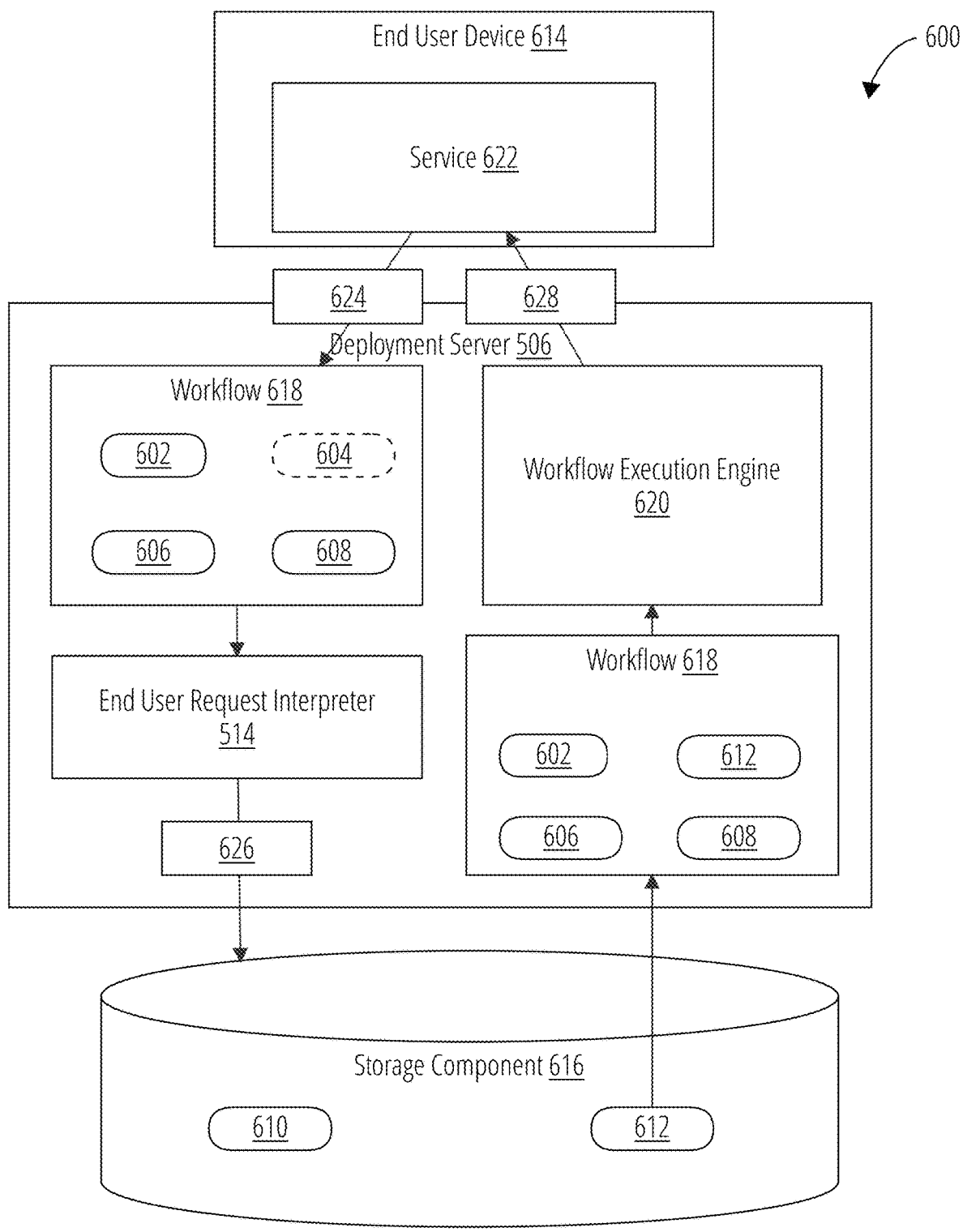
FIG. 6 illustrates a deployment system for deploying a service with a variable feature.

FIG. 6 illustrates a deployment system 600 deploying a service including a variable feature implemented by a workflow 618 including a variable functionality module 604. An end user device 614 accessing a service 622 sends an end user device request 624 to the deployment server 506 deploying the service 622. The end user device request 624 may be a request to access the service 622 as a whole or may be a request to access a feature of the service 622. Generally, to deploy a service, the deployment server 506 executes one or more workflows associated with features of the service. When an end user device requests a particular feature of a service, the deployment server 506 executes a workflow corresponding to that feature to fulfill the user request.

As shown in FIG. 6, the end user device request 624 causes the deployment server 506 to execute a workflow 618 including a variable functionality module 604. A workflow 618 including a variable functionality module 604 may be used, for example, to provide NLP functionality specific to different geographic locations (and regional dialects) while keeping the remainder of the workflow 618 consistent. In this example, the variable functionality module 604 may be a placeholder for an NLP functionality module. Depending on the geographic location of the end user device 614 as determined using the end user device request 624, one of multiple alternative functionality modules may replace the variable functionality module 604 for execution of the workflow 618.

After the deployment server 506 receives the end user device request 624 and determines that the workflow 618 implicated by the end user device request 624 includes a variable functionality module 604, an end user request interpreter 514 of the deployment server 506 receives and parses the end user device request 624. Generally, the variable functionality module 604 is associated with a feature condition that governs which of the alternative functionality modules is placed into the workflow 618 for execution. The feature condition is dependent on a characteristic of the end user device request 624, as described above with respect to FIG. 5.

The end user request interpreter 514 determines or receives the feature condition and parses the end user device request 624 for the feature condition to generate a request characteristic 626 for retrieving the correct alternative workflow from the multiple alternative workflows located on a storage component 616. Continuing with the example of a variable NLP functionality module, the feature condition may be the geographic location of the end user device 614 when the end user device request 624 is sent to the deployment server 506. The end user request interpreter 514 determines, from the workflow 618 that the feature condition for the variable functionality module 604 is geographic location and then parses the end user device request 624 to determine geographic location of the end user device 614. The end user request interpreter 514 then generates a request characteristic 626 indicating the geographic location of the end user device 614. In some implementations, the request characteristic 626 may be, for example, an indication of which geographic region of several fixed geographic regions the end user device 614 was in when generating the end user device request 624.

The end user request interpreter 514 uses the request characteristic 626 to communicate with the storage component 616 to retrieve the correct alternative functionality module by either directly communicating the request characteristic 626 to the storage component 616 or by using the request characteristic 626 to determine which alternative functionality module to request from the storage component 616. In this example, the 506 retrieves the alternative functionality module 612 from the storage component 616.

After retrieving the alternative functionality module 612, the deployment server 506 inserts the alternative functionality module 612 into the workflow 618 in place of the variable functionality module 604. In some implementations, the alternative functionality module 612 is stored in the storage component 616 with messaging objects for communication between the alternative functionality module 612 and adjacent functionality modules in the workflow 618. For example, the alternative functionality module 612 may be stored with a first messaging object configured to communicate with the functionality module 602 and a second messaging object configured to communicate with the functionality module 608. When the deployment server 506 retrieves the alternative functionality module 612 from the storage component 616, it also retrieves the first messaging object and the second messaging object. Accordingly, the alternative functionality module 612 may be directly and quickly deployed within the workflow 618.

In some implementations, the alternative functionality module 612 is stored in the storage component 616 without preconfigured messaging objects. This allows for more flexibility in adjusting the workflow 618. In these implementations, the deployment server 506 uses the alternative functionality module 612 to determine information about the inputs and outputs of the alternative functionality module 612 to configure messaging objects between the alternative functionality module 612 and adjacent functionality modules in the workflow 618. After the workflow 618 is configured with the alternative functionality module 612, the workflow 618 is executed by the workflow execution engine 620 of the deployment server 506. As discussed with respect to FIG. 5, the workflow execution engine 620 may deploy multiple containers to execute the workflow 618 or may use a developer independent resource based multithreading module in execution of the workflow 618. Execution of the workflow 618 generates an end user request response 628 that the deployment server 506 returns to the end user device 614 to fulfill the initial end user device request 624.

Figure 7:
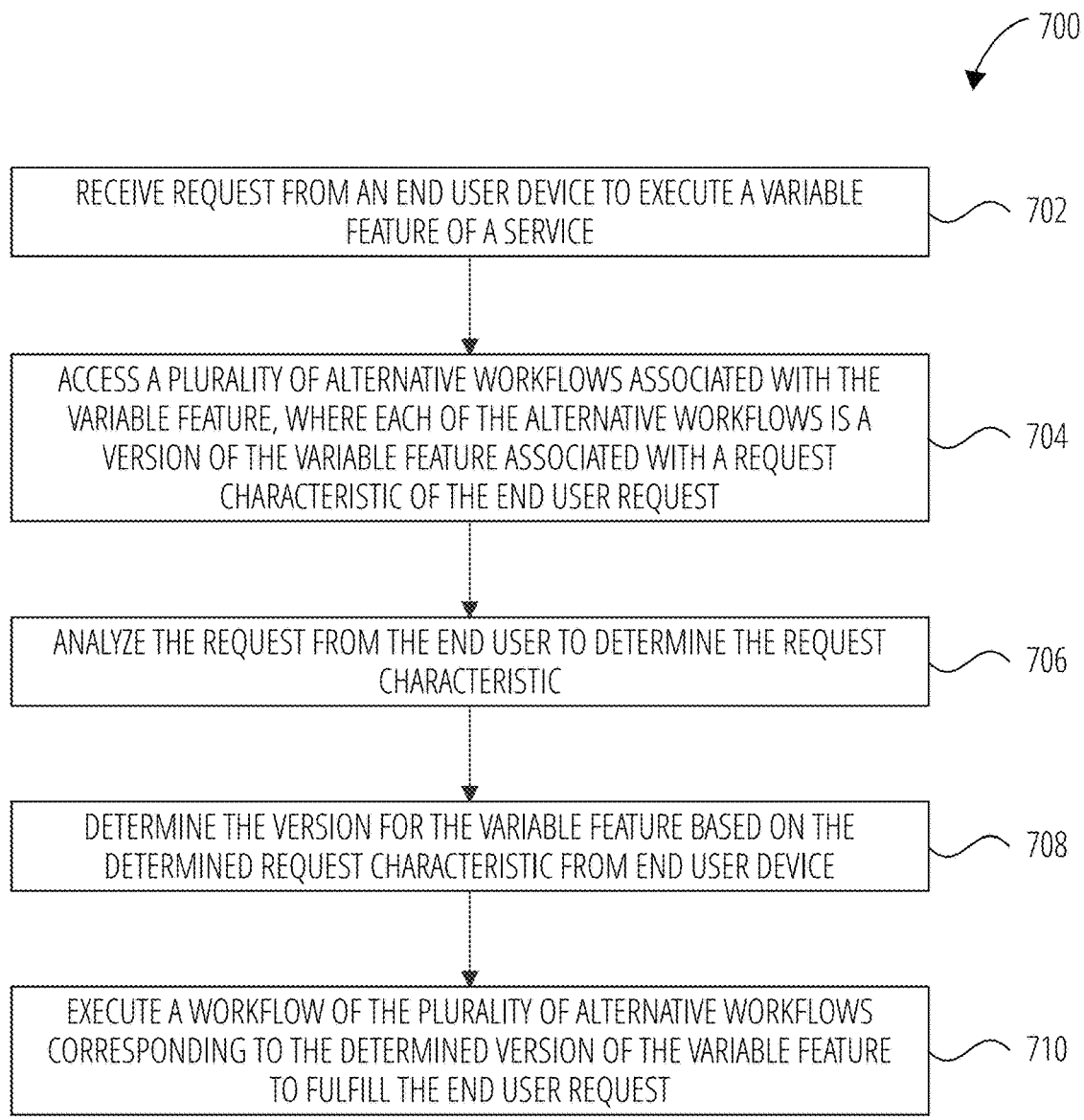
FIG. 7 illustrates operations for fulfilling a user request to access a feature of a service.

FIG. 7 illustrates operations for fulfilling a user request to access a feature of a service. A receiving operation 702 receives a request from an end user device to execute a variable feature of a service. The request may be received by a deployment server 108 in communication with an end user device 110. The request may be generated as a result of a request by the end user device 110 to access the service or to access a specific feature of the service.

An accessing operation 704 accesses a plurality of alternative workflows associated with the variable feature, where the alternative workflows are versions of the variable features associated with a request characteristic of the end user request. Each of the alternative workflows may be created using a graphical programming interface 300 or other programming interface at a configuration server 102 and defined as alternative workflows for the variable feature using a client user interface 400 at the configuration server 102. Generally, the configuration server 102 communicates with the deployment server 108 when a variable feature is updated via the graphical programming interface 300 or the client user interface 400.

An analyzing operation 706 analyzes the request from the end user to determine the request characteristic. In some implementations, an end user request interpreter 514, which may be part of the deployment server 506, parses the request from the end user after determining a feature condition associated with the variable feature to determine the request characteristic.

A determining operation 708 determines the version for the variable feature based on the determined request characteristic from the end user device. In some implementations, the client user interface 400 may be used to define versions for the variable feature for different request characteristics, such that each version is associated with a request characteristic. The deployment server 506 compares the determined request characteristic from the end user device with the request characteristics associated with the versions of the variable feature to determine which version corresponds to the request characteristic from the end user device A executing operation 710 executes a workflow of the plurality of alternative workflows corresponding to the determined version of the variable feature to fulfill the end user request. A workflow execution engine 516 of the deployment server 108 may execute the workflow associated with the determined version after retrieving the workflow from a storage device. In some implementations, the workflow execution engine 516 is configured to deploy multiple containers and deploy instances within the containers to execute the functionality modules of the workflow. In some implementations, the workflow execution engine 516 may use load balancing, such as the developer independent resource based multithreading module disclosed in U.S. patent application Ser. No. 16/692,941, entitled "Developer Independent Resource Based Multithreading Module" to efficiently execute the workflow. The deployment server 506 returns the result of the executed workflow to the end user device 110 to fulfill the request.

Figure 8:
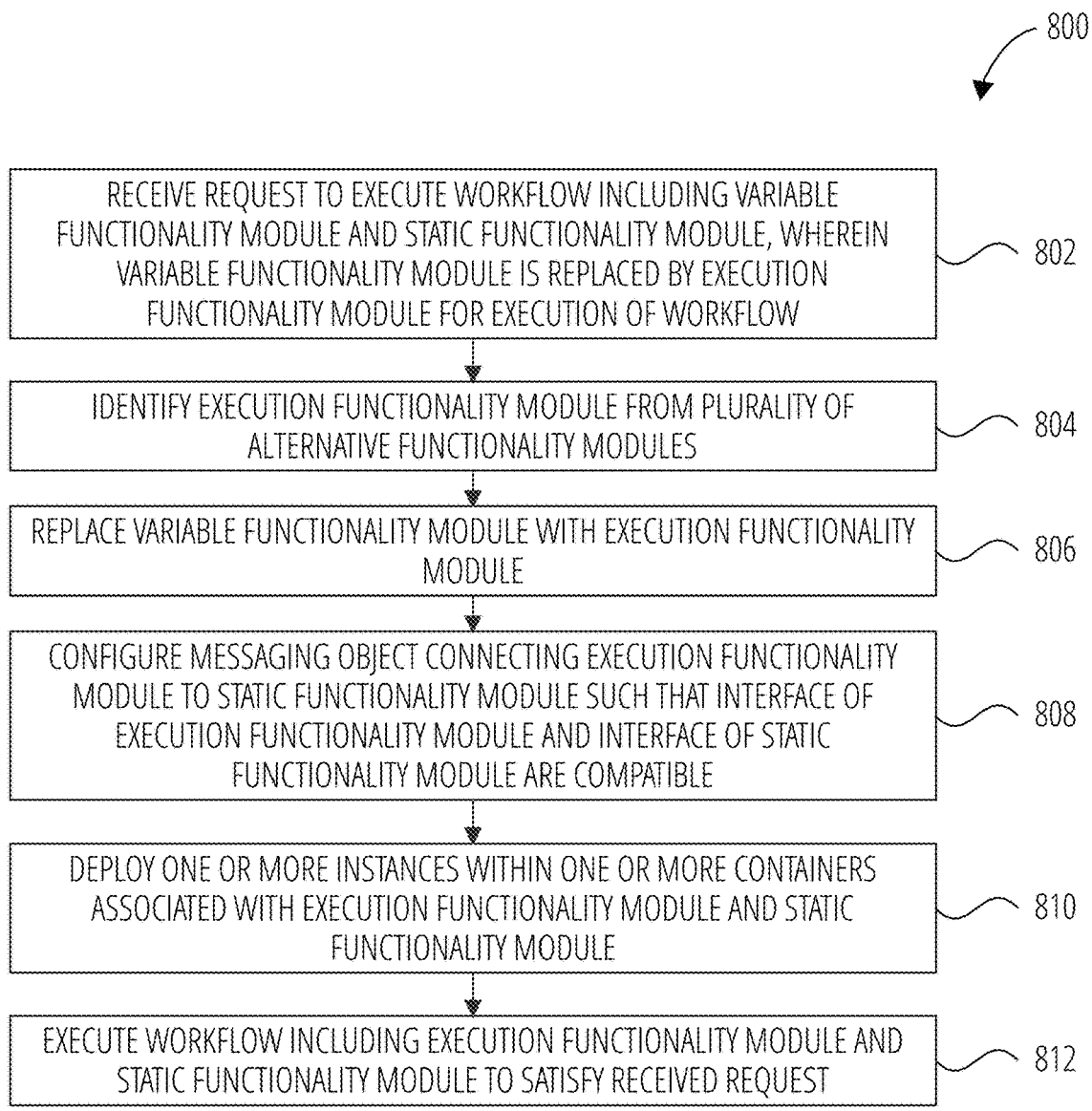
FIG. 8 illustrates operations for fulfilling a user request to access a feature of a service.

FIG. 8 illustrates operations for fulfilling a user request to access a feature of a service. A receiving operation 802 receives a request to execute a workflow including a variable functionality module and a static functionality module, wherein the variable functionality module is replaced by an execution functionality module for execution of the workflow. The request may be received at a deployment server 506 from an end user device 110 and may be generated as a result of a request from the end user device 110 to access a service including a feature corresponding to a workflow with a variable functionality module or as a result of a request to access a feature of a service implemented by executing a workflow with a variable functionality module.

An identifying operation 804 identifies the execution functionality module from a plurality of alternative functionality modules. The plurality of alternative functionality modules may be stored on a storage component 616 in communication with the deployment server 506 or located on the deployment server 506. The execution functionality module is generally identified based on a characteristic of the request from the end user device. For example, an end user request interpreter 514 may parse the end user request to determine a request characteristic associated with the variable functionality module. A replacing operation 806 replaces the variable functionality module with the execution functionality module.

A configuring operation 808 configures a messaging object connecting the execution functionality module to the static functionality module such that an interface of the execution functionality module and an interface of the static functionality module are compatible. In some implementations, the messaging object may be retrieved from the storage component 616 by the deployment server 506 along with the execution functionality module. In other implementations, the messaging object may be configured using information about the inputs and outputs of the execution functionality module and the static functionality module. The messaging object may allow incompatible functionality modules, such as those executed by separate interpreters, to communicate with one another.

A deploying operation 810 deploys one or more instances within one or more containers associated with the execution functionality module and the static functionality module. A workflow execution engine 620 of the deployment server 506 may deploy the one or more instances within the one or more containers as described in U.S. patent application Ser. No. 16/692,590.

An executing operation 812 executes the workflow including the execution functionality module and the static functionality module to satisfy the received request. In some implementations, the workflow execution engine 620 may use load balancing, such as a developer independent resource based multithreading module to execute the workflow. The result of the executed workflow is returned to the end user device to fulfill the initial request from the end user device.

Figure 9:
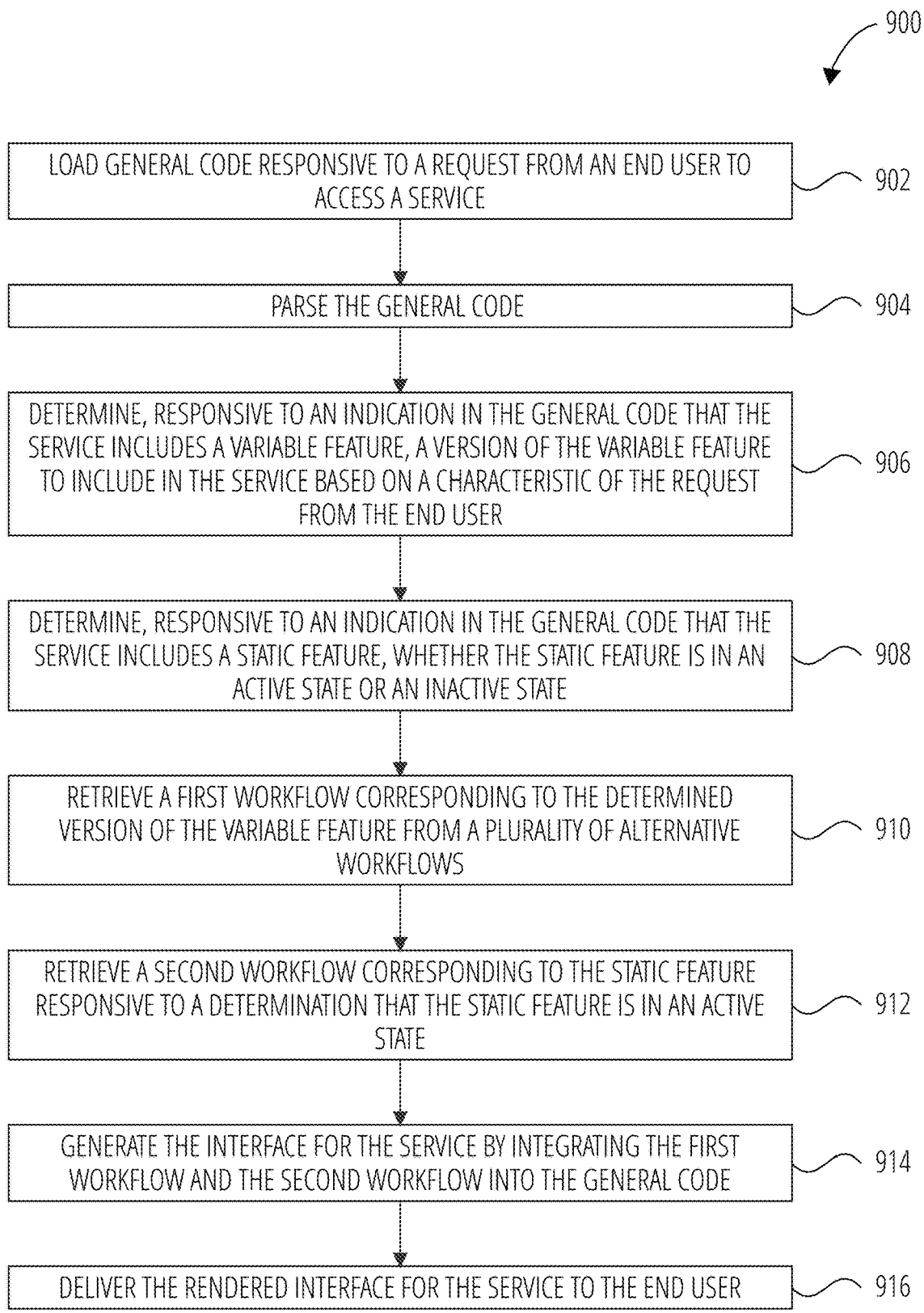
FIG. 9 illustrates operations for rendering a service including a variable feature and a static feature controlled using a client user interface.

FIG. 9 illustrates operations 900 for rendering a service including a variable feature and a static feature controlled using a client user interface. A loading operation 902 loads general code responsive to a request from an end user to access a service. The general code may be stored at the deployment server 108, or the deployment server 108 may retrieve the general code from the configuration server 102 or another location via the network 106. The general code broadly provides a template for the service, and includes indications where the service includes variable features and static features whose deployment is controlled via a client user interface (e.g., the client user interface 400).

A parsing operation 904 parses the general code. During the parsing operation 904, the deployment server 108 determines whether the general code includes indications that the service includes a variable feature or a static feature. Indications may include, for example, code that prompts the deployment server 108 to retrieve workflows corresponding to a feature from another location, code that provides conditions under which the deployment server 108 should retrieve additional code or workflows from another location, or code that instructs the deployment server 108 to skip or execute a portion of code within the general code.

A first determining operation 906 determines, responsive to an indication in the general code that the service includes a variable feature, a version of the variable feature to include in the service based on a characteristic of the request from the end user. The indication in the general code may prompt the deployment server 108 to retrieve a workflow or code for executing the variable feature or to execute or skip some of the code within the general code to implement the feature. Generally, the indication in the general code includes a request characteristic for the deployment server 108 to evaluate to determine which version of the variable feature to include in the service. For example, in the first determining operation 906, the deployment server 108 may execute the accessing operation 704, the analyzing operation 706, and the determining operation 708 described with respect to FIG. 7 to determine which version of the variable feature to include.

A second determining operation 908 determines, responsive to an indication in the general code that the service includes a static feature, whether the static feature is in an active state or an inactive state. The general code may include an instruction for the deployment server 108 to communicate with the configuration server 102 to check a current state of the static feature. Alternatively or additionally, the configuration server 102 may continuously update the deployment server 108 as states of static features are updated (e.g., using the client user interface 400). The deployment server 108 may store current states of static features received from the configuration server 102 and check the stored state of the static feature in the second determining operation 908.

A first retrieving operation 910 retrieves a first workflow corresponding to the determined version of the variable feature from a plurality of alternative workflows. The plurality of alternative workflows may be stored on the deployment server 108, the configuration server 102, or another location accessible using the network 106. A second retrieving operation 912 retrieves a second workflow corresponding to the static feature responsive to a determination that the static feature is in an inactive state. The second workflow may be stored on the deployment server 108, the configuration server 102, or another location accessible using the network 106.

A generating operation 914 generates the interface for the service by integrating the first workflow and the second workflow into the general code. The general code may include additional code for integrating the retrieved workflows into the general code for rendering the service. In some implementations, the first workflow and the second workflow may be converted to code similar to the general code (e.g., code that can execute using the same interpreter) and integrated into the general code to form the service code. The service code is then compiled and executed to generate the service. In other implementations, the first workflow and/or the second workflow may be executed in separate containers using a different interpreter than the general code. The first workflow and the second workflow may then be integrated and executed using the deployment techniques described in U.S. patent application Ser. No. 16/692,590, entitled "Container Architecture for Modular Machine Learning," such as configuring containers, interpreters, and messaging objects between the first workflow, the second workflow, and the general code.

A delivering operation 916 delivers the rendered interface for the service to the end user. The rendered interface is generally communicated to the end user device 110 over the network 106 by executing code generated in the generating operation 914. In some implementations, the deployment server 108 may continue to communicate with the end user device 110 as the end user continues to interact with the service.

Figure 10:
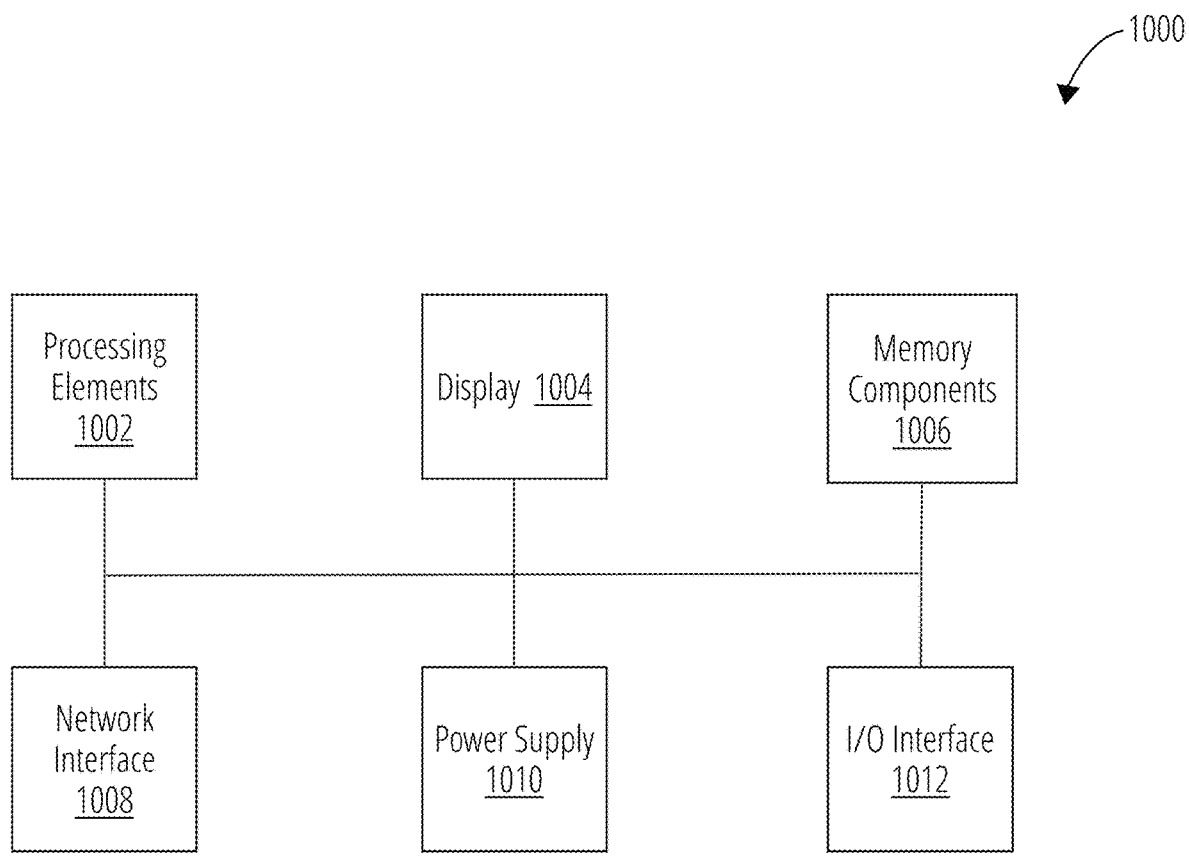
FIG. 10 illustrates a computing device.

FIG. 10 illustrates a computing device 1000 for various devices of the system 100, such as the client device 104 and the end user device 110. As shown, the various devices may include one or more processors 1002, a display 1004, one or more memory components 1006, a network interface 1008, a power supply 1010, and an I/O interface 1012 where the various components may be in direct or indirect communication with one another, such as via one or more system buses, contact traces, wiring, or via wireless mechanisms.

The one or more processors 1002 may be substantially any electronic device capable of processing, receiving, and/or transmitting instructions. For example, the one or more processors 1002 may be a microprocessor, microcomputer, graphics processing unit, or the like. The one or more processors 1002 may include one or more processing elements or modules that may or may not be in communication with one another. For example, a first processing element may control a first set of components of the computing device 1000 and second processing element may control a second set of components of the computing device 1000 where the first and second processing elements may or may not be in communication with each other. Relatedly, the one or more processors 1002 may be configured to execute one or more instructions in parallel locally, and/or across the network 106, such as through cloud computing resources.

The display 1004 is optional and provides an input/output mechanism for the computing device 1000, such as to display visual information (e.g., images, graphical user interfaces, videos, notifications, and the like) to the user, and in certain instances may also act to receive user input (e.g., via a touch screen or the like). For example, the display 1004 may display the client user interface 400 and receive requests from the client user to enable or disable a feature of a service. The display 1004 may be a liquid crystal display screen, plasma screen, light emitting diode screen, an organic light emitting diode screen, or the like. The type and number of displays comprising the display 1004 may vary with the type of computing device 1000 (e.g., smartphone versus a desktop computer).

The memory components 1006 store electronic data that may be utilized by the computing device 1000, such as audio files, video files, document files, programming instructions, and the like. The memory components 1006 may be, for example, non-volatile storage, a magnetic storage medium, optical storage medium, magneto-optical storage medium, read only memory, random access memory, erasable programmable memory, flash memory, or a combination of one or more types of memory components. In many embodiments, the configuration server 102 and the deployment server 108 may have a larger memory capacity than the client device 104 and the end user device 110, with the memory components 1006 optionally linked via a cloud network or the like.

The network interface 1008 receives and transmits data to and from the network 106 to the client device 104, the end user device 110, the configuration server 102, and the deployment server 108. The network interface 1008 may transmit and send data to the network 106 directly or indirectly. For example, the network interface 1008 may transmit data to and from other computing devices through the network 106 which may be a cellular, satellite, or other wireless network (WiFi, WiMAX, Bluetooth) or a wired network (Ethernet), or a combination thereof. In some embodiments, the network interface 1008 may also include various modules, such as an API that interfaces and translates requests across the network 106 (deleted) to specific local computing elements for the client device 104 and the end user device 510.

The client device 104, the end user device 110, the configuration server 102, and the deployment server 506 may also include a power supply 1010. The power supply 1010 provides power to various components of the computing device 1000. The power supply 1010 may include one or more rechargeable, disposable, or hardwire sources, e.g., batteries, power cord, AC/DC inverter, DC/DC converter, or the like. Additionally, the power supply 1010 may include one or more types of connectors or components that provide different types of power to the computing device 1000. In some embodiments, the power supply 1010 may include a connector (such as a universal serial bus) that provides power to the computing device 1000 or batteries within the computing device 1000 and also transmits data to and from the computing device 1000 to other devices.

The I/O interface 1012 allows the computing device 1000 to receive input from a user and provide output to the user. For example, the I/O interface 1012 may include a capacitive touch screen, keyboard, mouse, stylus, or the like. The types of devices that interact via the I/O interface 1012 may be varied as desired. The computing device 1000 may be in communication with a compute back end such as the configuration server 102 or a cloud provider (e.g., Google Cloud Platform, Amazon Web Services, Microsoft Azure, or the like).

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. A configuration server comprising:
   one or more processors;
   a workflow generator executing on the one or more processors and configured to generate a workflow corresponding to a feature of a service;
   a client user interface configured to receive requests from a client user to enable or disable the feature of the service, wherein the client user interface comprises a first feature control element configured to receive the requests to enable or disable the feature of the service, wherein the client user interface comprises a second feature control element configured to receive requests from the client user to enable or disable the second feature of the service; and
   a service director configured to control deployment of the feature of the service by:
      placing the workflow corresponding to the feature in an active state responsive to a client user request to enable the feature of the service, wherein the second feature control element is configured to reject a request to place the second feature in the active state when the feature is in the active state, placing the workflow corresponding to the feature in an inactive state responsive to a client user request to disable the feature of the service, wherein the second feature is displayable as part of the service when the feature is in the inactive state, and communicating the workflow to a deployment server responsive to a determination that the workflow is in the active state, wherein the feature associated with the workflow is active to an end user accessing the service when the workflow is communicated to the deployment server.

2. The configuration server of claim 1, wherein the service director is further configured to communicate that the workflow is in the inactive state responsive to a determination that the workflow is in the inactive state.

3. The configuration server of claim 1, wherein the second feature control element places the second feature in the active state responsive to the feature being placed in the inactive state.

4. The configuration server of claim 1, wherein the service director is further configured to:

store a feature condition received from the client user; and
place the feature in the active state responsive to receipt of an end user request to access the service that meets the feature condition.

5. The configuration server of claim 1, wherein the workflow generator is configured to generate the workflow corresponding to the service by configuring, responsive to a user request to link a first functionality module to a second functionality module, a messaging object to adapt an output of the first functionality module for compatibility with the second functionality module based on a defined relationship between the first functionality module and the second functionality module, wherein the workflow comprises the first functionality module, the second functionality module, and the messaging object.

6. The configuration server of claim 5, wherein the first functionality module is operable to execute within a first container to perform an artificial intelligence operation.

7. The configuration server of claim 1, wherein the workflow generator is configured to generate the workflow by modifying a template workflow responsive to a request from the client user to include the template workflow in the service.

8. A method comprising:

generating a plurality of alternative workflows corresponding to a variable feature of a service, wherein each of the plurality of alternative workflows corresponds to a version of the variable feature, wherein generating the plurality of workflows comprises, for at least one workflow of the plurality of workflows:

configuring, responsive to a user request to link a first functionality module to a second functionality module, a messaging object to adapt an output of the first functionality module for compatibility with the second functionality module based on a defined relationship between the first functionality module and the second functionality module, wherein the at least one workflow comprises the first functionality module, the second functionality module, and the messaging object;

receiving a request from an end user device to execute the variable feature of the service;

determining the version for the variable feature of the service based at least on a characteristic of the request from the end user device; and executing a workflow of the plurality of alternative workflows corresponding to the version of the variable feature.

9. The method of claim 8, wherein characteristic of the request is an input format of the request and each of the plurality of alternative workflows is configured to receive a different input format.

10. The method of claim 8, wherein the variable feature is an artificial intelligence (AI) feature of the service.

11. The method of claim 8, wherein the characteristic of the request is an active user profile on the end user device.

12. The method of claim 8, wherein characteristic of the request for each version of the variable feature is selected by a client user using a client user interface at a configuration server.

13. The method of claim 12, wherein the request from the end user device is received at a communication interface of a deployment server in communication with the configuration server and the workflow is executed by a workflow execution engine of the deployment server.

14. A method comprising:

receiving a request to execute a workflow including a variable functionality module and a static functionality module, wherein the variable functionality module is replaced by an execution functionality module for execution of the workflow;

identifying the execution functionality module from a plurality of alternative functionality modules;

replacing the variable functionality module with the execution functionality module;

configuring a messaging object connecting the execution functionality module to the static functionality module such that an interface of the execution functionality module and an interface of the static functionality module are compatible;

deploy one or more instances within one or more containers associated with the execution functionality module and the static functionality module; and executing the workflow including the execution functionality module and the static functionality module to satisfy the received request.

15. The method of claim 14, wherein the messaging object is configured based on information about an input or output of the execution functionality module and an input or output of the static functionality module.

16. The method of claim 14, wherein the execution functionality module is identified from the plurality of alternative functionality modules based on a characteristic of the request to execute the workflow.

17. The method of claim 14, wherein each of the plurality of alternative functionality modules are configured to perform an AI function.

18. The method of claim 14, further comprising:

returning a result of the executed workflow to an end user device to satisfy the received request.

* * * * *